(12) United States Patent
Young et al.

(10) Patent No.: US 8,365,091 B2
(45) Date of Patent: Jan. 29, 2013

(54) NON-UNIFORM SCROLLING

(75) Inventors: Anthony Young, Fall City, WA (US);
Niels Van Dongen, Shaw Island, WA (US); Erika Carlson, Bothell, WA (US); Jeffrey N. Margolis, Seattle, WA (US); William Vong, Hunts Points, WA (US); Joseph Michael Downing, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 665 days.

(21) Appl. No.: 12/349,393

(22) Filed: Jan. 6, 2009

(65) Prior Publication Data

US 2010/0175027 A1  Jul. 8, 2010

(51) Int. Cl.
*G06F 3/048* (2006.01)
(52) U.S. Cl. ..................... 715/784; 715/830
(58) Field of Classification Search .......... 715/784, 715/830
See application file for complete search history.

(56) References Cited

U.S. PATENT DOCUMENTS

| 7,030,861 | B1 | 4/2006 | Westerman et al. | |
|---|---|---|---|---|
| 2004/0135824 | A1 | 7/2004 | Fitzmaurice | |
| 2004/0155888 | A1 | 8/2004 | Padgitt et al. | |
| 2006/0048072 | A1* | 3/2006 | Jarrett et al. | 715/784 |
| 2006/0274053 | A1* | 12/2006 | Kinouchi | 345/173 |
| 2007/0097088 | A1 | 5/2007 | Battles | |
| 2007/0150830 | A1* | 6/2007 | Ording et al. | 715/784 |
| 2008/0042989 | A1 | 2/2008 | Westerman et al. | |
| 2008/0165255 | A1 | 7/2008 | Christie et al. | |
| 2009/0186671 | A1* | 7/2009 | Nitanda | 455/575.4 |
| 2009/0231271 | A1* | 9/2009 | Heubel et al. | 345/156 |

OTHER PUBLICATIONS

Steinicke, et al., "Multi-Touching 3D Data: Towards Direct Interaction in Stereoscopic Display Environments Coupled with Mobile Devices", retrieved at <<http://viscg.uni-muenster.de/publications/2008/SHSK08/ppd-workshop.pdf>>, pp. 4.
Moscovich, Tomer, "Principles and Applications of Multi-Touch Interaction", retrieved at <<http://www.cs.brown.edu/~tm/papers/moscovich_dissertation.pdf>>, May 2007, pp. 114.
"Windows 7: Reach Out and Touch It!", retrieved at <<http://download.microsoft.com/download/a/d/f/adf1347d-08dc-41a4-9084-623b1194d4b2/Win7_touch.docx>>, Oct. 29, 2008, pp. 8.
Rekimoto, Jun, "SmartSkin: An Infrastructure for Freehand Manipulation on Interactive Surfaces", retrieved at <<http://www.media.mit.edu/resenv/classes/MAS965/readings/SmartSkin.pdf>>, CHI 2002, pp. 8.

* cited by examiner

*Primary Examiner* — Alvin Tan
*Assistant Examiner* — Rinna Yi
(74) *Attorney, Agent, or Firm* — Alleman Hall McCoy Russell & Tuttle LLP

(57) ABSTRACT

Embodiments related to the non-uniform scrolling of a scrollable list displayed on a computing device display are disclosed. For example, one disclosed embodiment provides a method of operating a display comprising displaying a scrollable list of items that includes a first pair of list positions separated by a first spacing on the display, and a second pair of list positions separated by a second spacing that is different than the first spacing. The method further comprises detecting a movement of a manipulator from a first location to a second location, and in response, scrolling a first list item on the display between the first pair of list positions at a first scroll distance/manipulator movement distance correspondence, and scrolling a second list item between the second pair of list positions at a second scroll distance/manipulator movement distance correspondence.

20 Claims, 4 Drawing Sheets

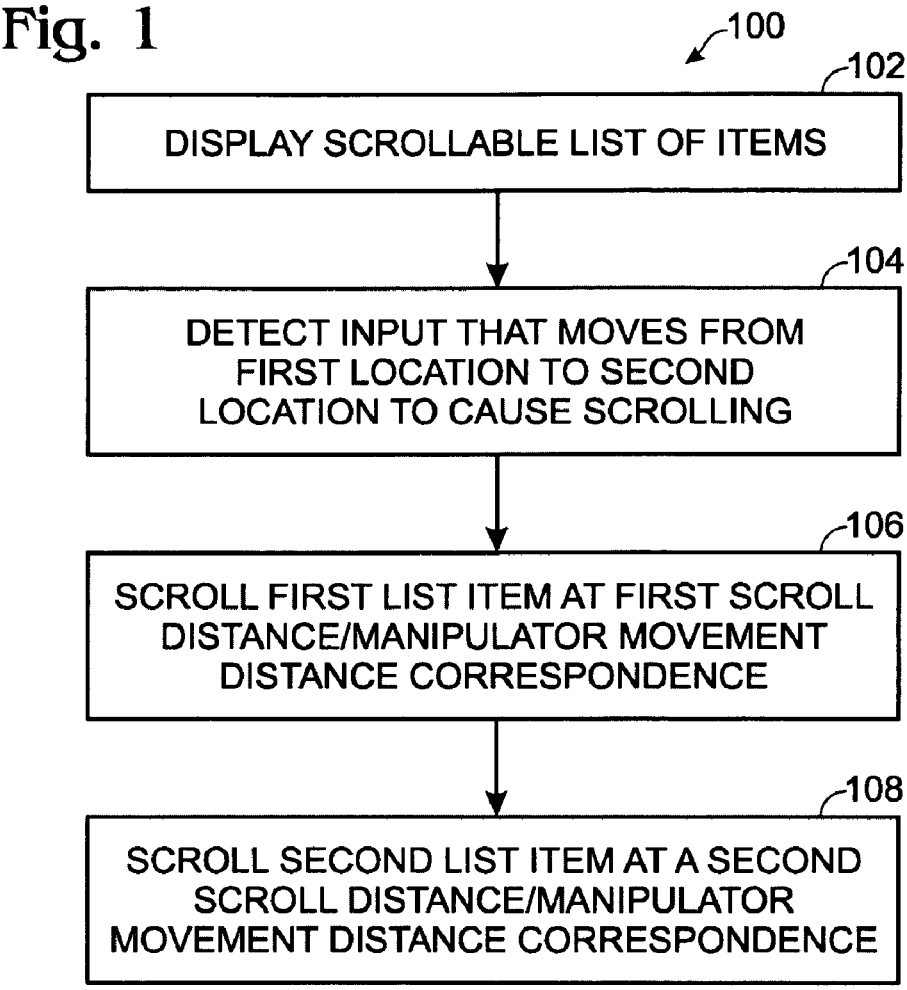
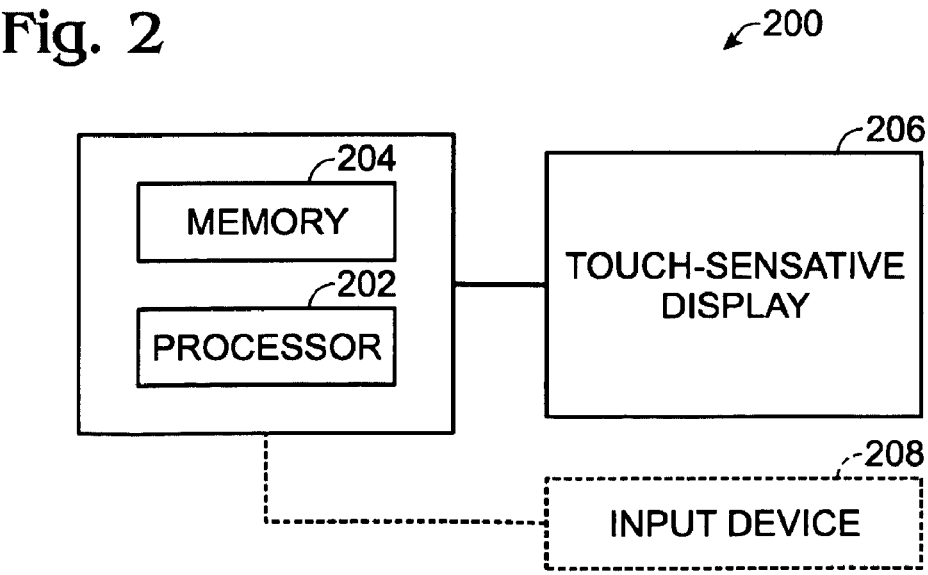

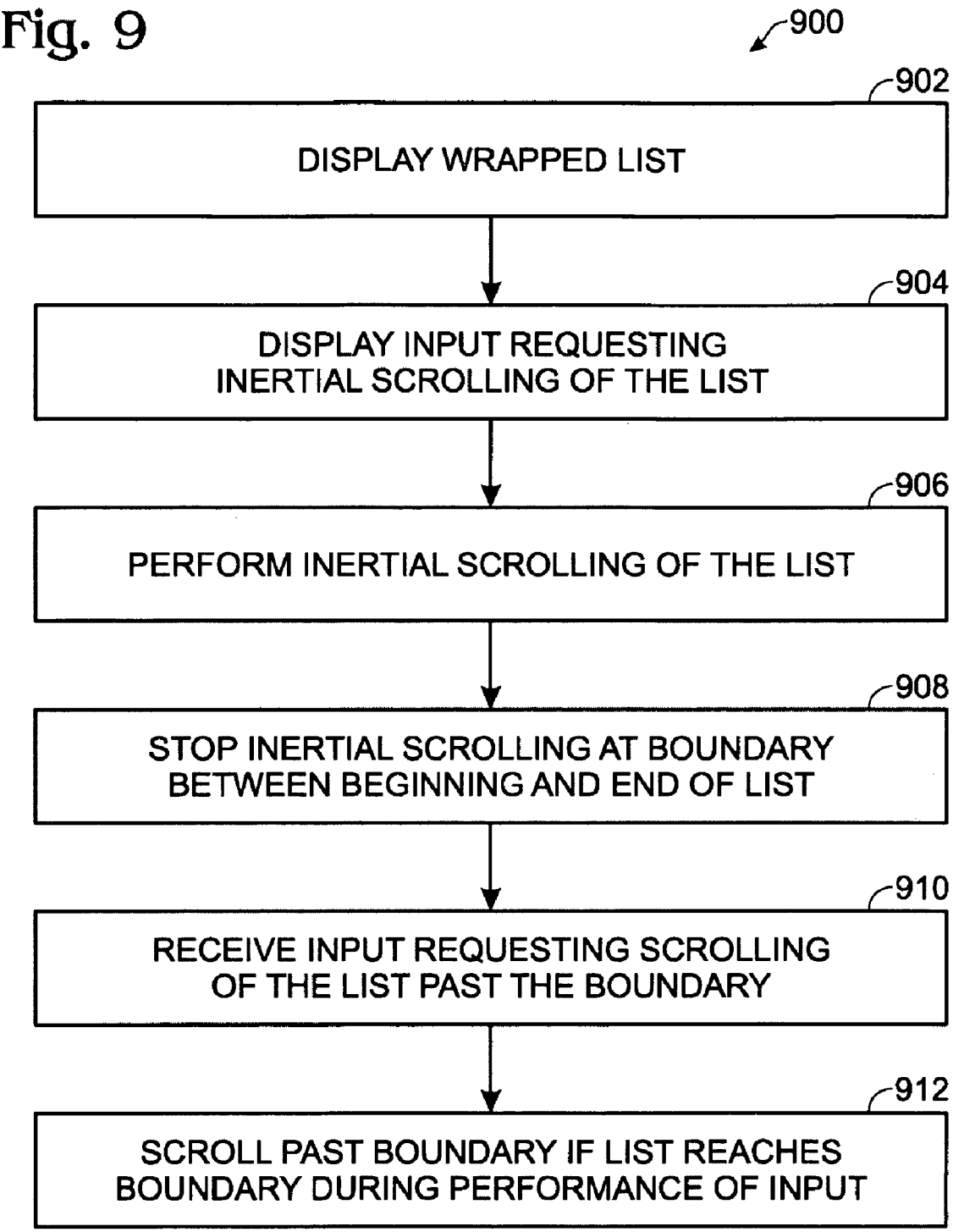

NON-UNIFORM SCROLLING

BACKGROUND

Computing devices may be configured to present lists of content and other resources to a user via a scrollable list displayed on a graphical user interface. A user may scroll through such a list via any of a number of different types of controls. For example, some scrollable lists utilize a scroll bar with a "scroll box" or "scroll thumb" which may be dragged via a cursor controlled by a mouse or other input device to cause the list to scroll. Other scrollable lists, including but not limited to lists intended for use with a touch-sensitive display, may be scrolled via movement of a manipulator, such as a cursor, finger, stylus, etc. positioned over the list.

Different scrollable lists may utilize different rates of scrolling for a given motion of an input device (e.g. cursor or touch). For example, movement of a scroll thumb may cause a list to scroll a proportional distance relative to an overall length of the list. On the other hand, a scrollable list intended for use with a touch-sensitive display may be configured to scroll in a 1/1 correspondence between scroll distance and touch movement distance, such that the motion of the list tracks the motion of a user's finger. In any case, as long as each item in the list maintains a constant size in the scrolling direction and a constant spacing relative to adjacent list items during scrolling, the rate of scrolling may be maintained at a uniform rate throughout the viewable portion of the list.

SUMMARY

Various embodiments are disclosed herein that relate to the non-uniform scrolling of a scrollable list displayed on a computing device display. For example, one disclosed embodiment provides a method of scrolling a scrollable list of items on a display, the scrollable list of items comprising a first pair of list positions separated by a first spacing on the display, and a second pair of list positions separated by a second spacing that is different than the first spacing. The method comprises detecting an input that comprises a movement of a manipulator from a first location to a second location to cause scrolling of the list, and in response, scrolling a first list item on the display between the first pair of list positions at a first scroll distance/manipulator movement distance correspondence, and scrolling a second list item between the second pair of list positions at a second scroll distance/manipulator movement distance correspondence that is different from the first scroll distance/manipulator movement distance correspondence.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 shows a flow diagram depicting an embodiment of a method of scrolling a scrollable list of items on a computing device display.

FIG. 2 shows a block diagram of an example embodiment of a computing device.

FIG. 9 shows a flow diagram depicting another embodiment of a method for scrolling a scrollable list on a display.

DETAILED DESCRIPTION

Figure 3:
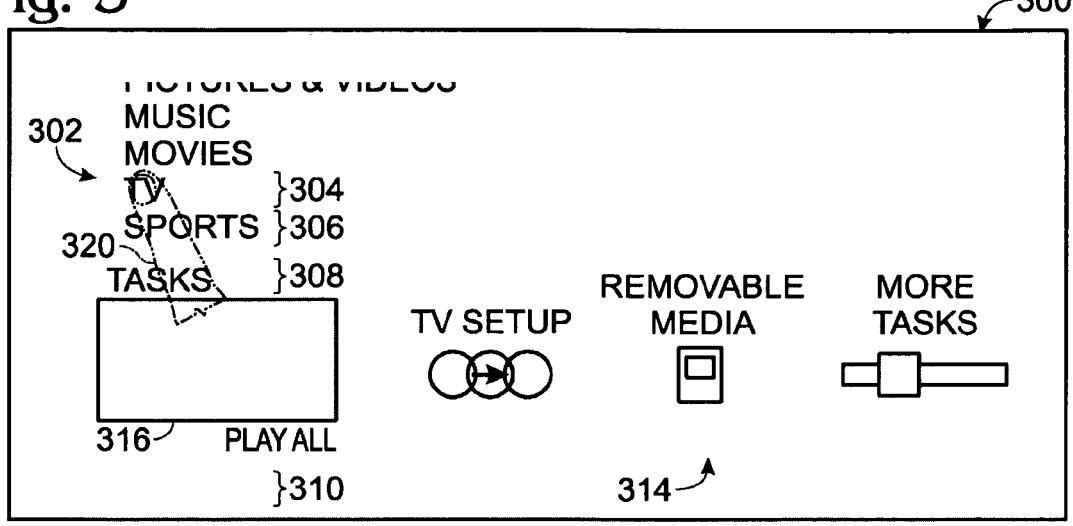
FIG. 3 shows a view of an embodiment of a scrollable list displayed on an embodiment of a graphical user interface.

FIG. 1 illustrates an embodiment of a method 100 for scrolling a scrollable list displayed on a computing device display. As will be described in more detail below, method 100 provides for the non-uniform scrolling of a list where the spacing between list positions on a display is not constant, but rather varies between one or more pairs of list positions. The term "list position" as used herein refers to a space occupied by a list item displayed on the touch-sensitive display, such that a list item scrolls between list positions as it moves on the display during scrolling. Further, the terms "spacing", "separated", "separation" and the like refer to the distance between any point in a list position and a corresponding point in an adjacent list position.

Method 100 first comprises, at 102, displaying a scrollable list of items on a computing device display. The scrollable list of items comprising a first pair of list positions separated by a first spacing on the display, and a second pair of list positions separated by a second spacing that is different than the first spacing. Next, method 100 comprises, at 104, detecting an input via the display, wherein the input is a movement of a manipulator, such as a finger on a touch-sensitive display or a cursor on a graphical user interface, from a first location to a second location on the display. In response to detecting the touch input, method 100 comprises, at 106, scrolling a first list item between a first pair of positions at a first scroll distance/manipulator movement distance correspondence, and, at 108, scrolling a second list item between a second pair of list positions at second scroll distance/manipulator movement distance correspondence that is different from the first scroll distance/manipulator movement distance correspondence. In this manner, scrolling rates can be adjusted relative to a touch input movement rate to accommodate scrollable lists in which the spacings between adjacent list positions vary across the displayed portion of a list.

Before discussing method 100 in the context of an example embodiment, it will be understood that method 100 may be performed on any suitable computing device. FIG. 2 shows a block diagram of an example of a computing device 200. Computing device 200 comprises a processor 202, and memory 204 comprising programs in the form of instructions stored thereon that are executable by the processor 202 to perform one or more of the methods disclosed herein. Further, the depicted computing device 200 comprises a touch-sensitive display 206 as an input and output device. It will be understood that the touch-sensitive display 206 may be incorporated into the computing device 200 (for example, in the case of a smart phone, laptop computer, etc.), or may be separate from the computing device 200 (for example, in the case of a desktop computer with separate monitor). The computing device 200 may include other input devices as well, collectively shown at 208. Such devices may include, but are not limited to, keyboards, cursor control devices (e.g. mice, touch pads, track balls, off-surface mice, etc.), gesture-based input devices (glove-based input devices, facial recognition input devices, wand-based devices, etc.), various sensors, etc. The computing device likewise may include additional output devices (not shown), such as speakers, haptic feedback mechanisms, other displays, printers, etc. In embodiments that utilize a cursor control device or gesture-based input device other than a touch-sensitive display, it will be understood that the computing device may omit the depicted touch-sensitive display.

FIGS. 3-8 illustrate an embodiment of an example implementation of method 100, in the context of a graphical user interface 300 depicting a vertically scrollable list 302 that allows a user of a media player to select between various media sources and other options. First referring to FIG. 3, the user interface 300 comprises a number of unhighlighted list positions, such as positions 304 and 306, and also a highlighted list position 308. The spacing between adjacent unhighlighted list positions, including between unhighlighted positions 304 and 306, is depicted as being uniform across the list, while the spacing between the highlighted list position 308 and each adjacent unhighlighted list position 306, 310 is greater than the spacing between adjacent unhighlighted list positions 304, 306.

The term "highlighted" list position refers to herein as a list position in which the list item is visually distinguished from other list items, for example, by size, spacing, color, etc. Further, in some embodiments, the highlighted list item may be selectable by a user to reveal additional information regarding a list item, including but not limited to additional functionalities, additional content, etc. For example, in the depicted embodiment, the highlighted list position 308 is positioned above a viewing pane, or "lens" 316, in which details are shown regarding the list item that is currently occupying the highlighted list position 308. Further, a horizontally scrollable submenu 314 may be displayed for the list item that is currently occupying the highlighted list position. The items in the horizontally scrollable submenu 314 may be scrolled into the lens 316 for selection by a user. It will be understood that additional information on each submenu item may be displayed in the lens; however, the lens 316 is shown as empty in FIGS. 3-8 for the purpose of clarity.

Figure 4:
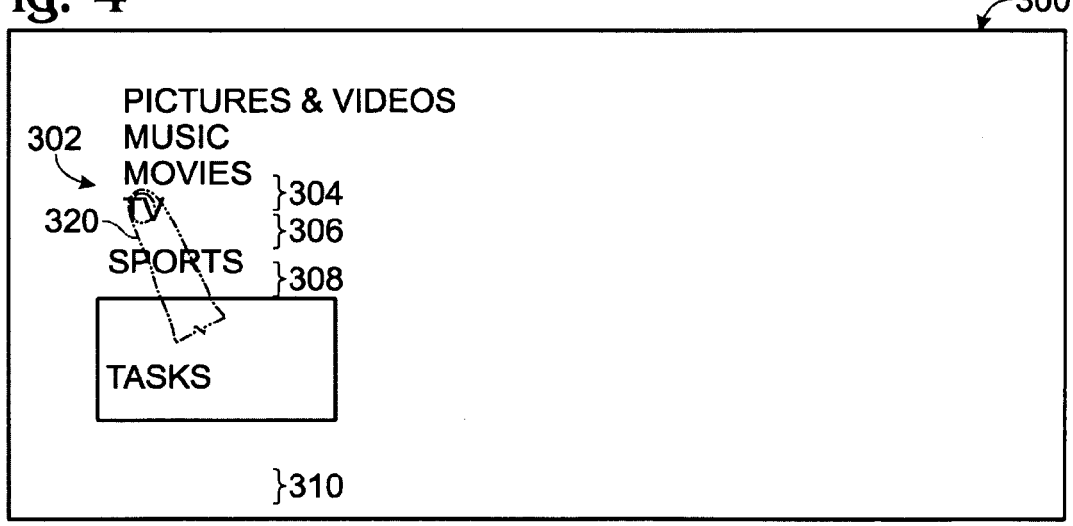
FIG. 4 shows the scrollable list of FIG. 3 after scrolling a list item from a first unhighlighted list position toward an adjacent unhighlighted list position via a touch input.
Figure 5:
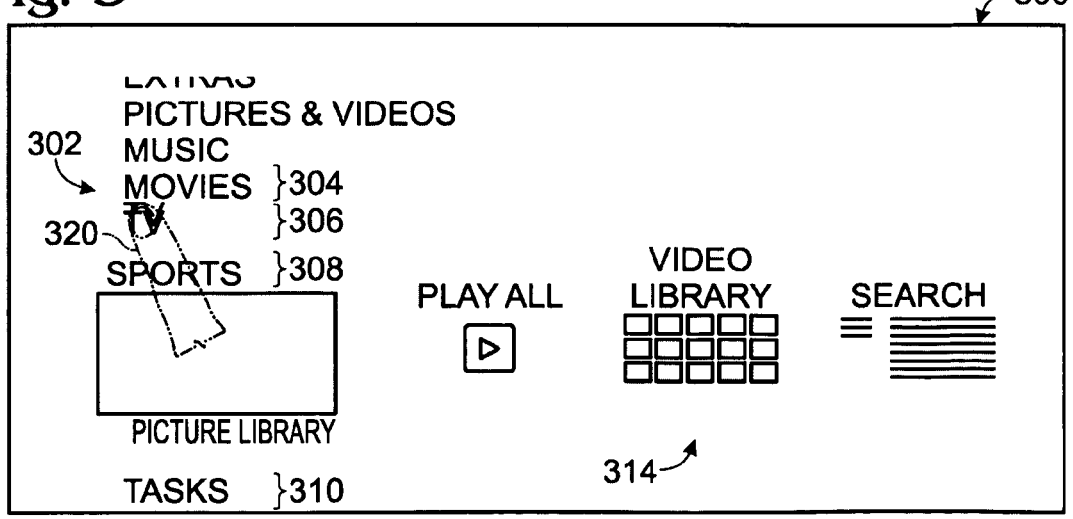
FIG. 5 shows the scrollable list of FIG. 3 after scrolling the list item fully to the adjacent unhighlighted list position.

FIG. 3 also shows a manipulator in the form of a finger 320 positioned over the "TV" list item that is located in list position 304. Referring next to FIGS. 4 and 5, as the finger 320 is moved along the vertical scrolling direction of the list (i.e. from an upper edge of the graphical user interface 300 to a lower edge of the graphical user interface 300), the list moves in the same direction as the finger 320 and in a 1/1 scrolling distance/touch movement distance correspondence along a direction of the scrolling such that the "TV" list item follows the motion of the finger 320. The 1/1 motion correspondence gives the user the impression that the user is physically "dragging" the list in the direction of finger motion. As the distance of movement of the finger is equal to the first spacing, the "TV" list item and the finger 320 arrive at list position 306 together. While described in the context of vertical scrolling, it will be understood that the concepts disclosed herein also may be utilized in horizontal scrolling (i.e. from side to side in the graphical user interface 300), or in any other suitable scrolling direction. Additionally, in the depicted embodiment, the "TV" list item moves in a direction normal to the scrolling direction, as well as along the scrolling direction, when moving into the highlighted list position to give the "TV" list item a slight left-hand offset to the rest of the list when in the highlighted list position 308. However, it will be understood that a list item may have any other suitable horizontal offset, including no offset, relative to the rest of the list items when in the highlighted list position 308.

Figure 6:
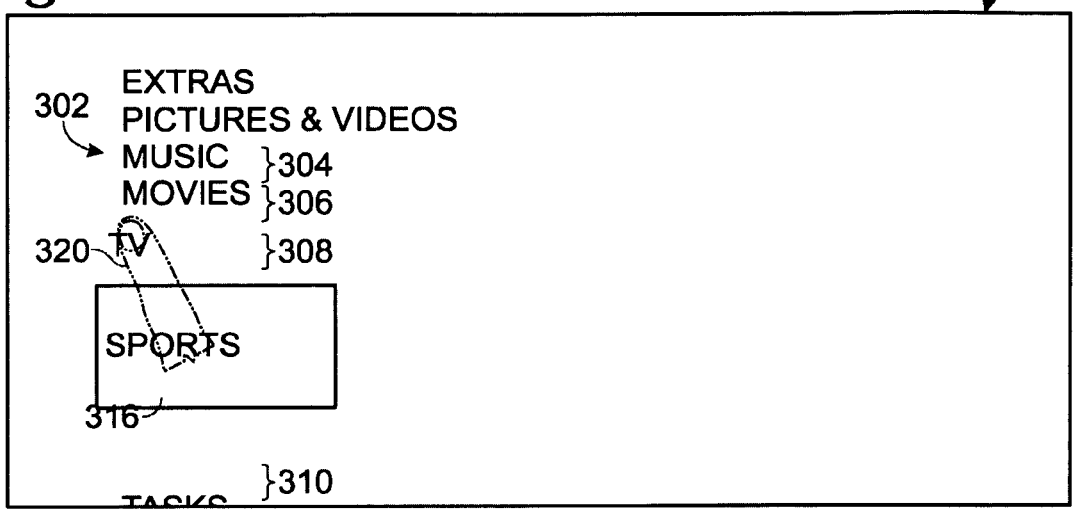
FIG. 6 shows the scrollable list of FIG. 3 after scrolling the list item from the adjacent unhighlighted list position toward a highlighted list position.
Figure 7:
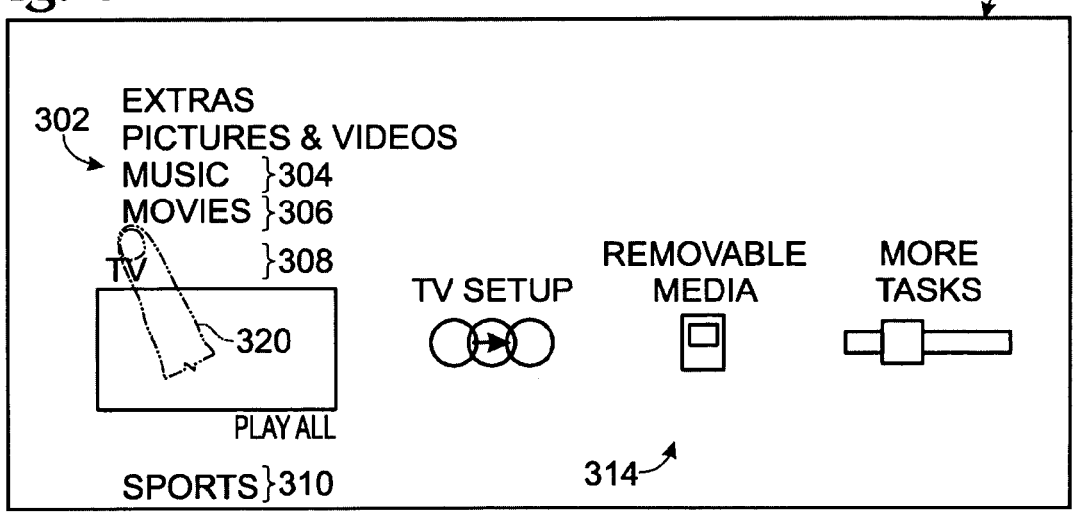
FIG. 7 shows the scrollable list of FIG. 3 after scrolling the list item fully to the highlighted list position.
Figure 8:
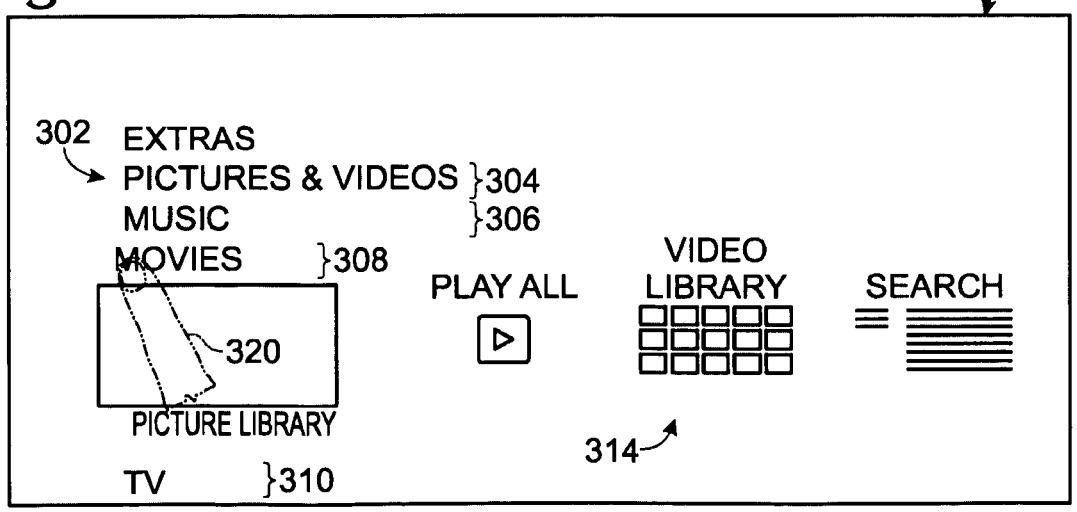
FIG. 8 shows the scrollable list of FIG. 3 after scrolling the list item beyond the highlighted list position.

Likewise, during this movement, all other list items located in unhighlighted list positions above the "TV" list item are moved in the same 1/1 scrolling distance/touch movement distance correspondence. It can also be seen that the "SPORTS" list item is moved to the highlighted list position 308, and the "TASKS" list item is moved out of the highlighted list position 308 to list position 310, at non 1/1 scroll distance/touch movement distance correspondences. FIGS. 6-7 illustrate movement of the "TV" list item from unhighlighted list position 306 to highlighted list position 308. As described above, the spacing between unhighlighted list position 306 and highlighted list position 308 is greater than the spacing between adjacent unhighlighted list positions 304 and 306. To accommodate the greater spacing, the "TV" list item moves to the highlighted list position at a scroll distance/touch movement distance correspondence of greater than 1/1, such that the "TV" list item moves farther than the touch input when moving from position 306 to position 308. Further, as illustrated in FIG. 8, the "TV" list item also moves farther than the touch input when moving from list position 308 to list position 310. The motion of a list item between list position 308 and list position 310 is also illustrated by the motion of the "TASKS" list item shown in FIGS. 3-5.

It will be understood that, in other embodiments, the "TV" list item (or any other list item that is located directly beneath a user's finger) may continue to scroll in 1/1 correspondence with finger movement as the item is moved between highlighted list position 308 and adjacent unhighlighted list positions. In this case, the scrolling of other list items between adjacent unhighlighted list locations may slow down to a scroll distance/touch movement distance correspondence of less than 1/1 in response. In yet other embodiments, any other suitable adjustment may be made to the scroll distance/touch movement distance correspondence between list positions.

While the disclosed embodiments are described in the context of a touch input received from a finger 320, it will be understood that any other suitable touch manipulator may be used instead of a finger, including but not limited to styluses and other objects. Further, it will be understood that another type of manipulator, such as a cursor controlled by a mouse, off-surface mouse, track ball, touch pad or the like, also may be used to scroll a list as disclosed herein by placing the cursor directly over the list and then moving the cursor in a desired scrolling direction to cause non-uniform scrolling as described herein. Further, other gesture-based input devices, such as wand-based input devices, glove-based input devices, facial recognition devices, etc. also may be used as manipulators to scroll a list as disclosed herein.

Any suitable relationship may be used to modify the scroll rate between list positions. For example, in the embodiment depicted in FIGS. 3-8, the scroll distance/touch movement distance correspondences for movement between highlighted list position 308 and adjacent unhighlighted list positions 306, 310, are adjusted away from a 1/1 ratio in a manner proportional to the distance between the list positions. For example, referring to the spacing between adjacent unhighlighted list positions as a first spacing and the spacing between the highlighted list position and an adjacent unhighlighted list position as a second spacing, the scroll distance/touch movement distance correspondence when moving a list item across the second spacing may be based upon the ratio of the second spacing over the first spacing. As a more specific example, if the distance between unhighlighted list position 306 and highlighted list position 308 is 1.5 times as far as the distance between unhighlighted list positions 304 and 306, then the list item may move 1.5 times as far as the movement of the finger 320 when moving between these positions.

In other embodiments, other adjustments may be made to the scroll distance/touch movement distance correspondence. For example, the correspondence may change during the movement of a list item based upon a distance of the list item from a nearest list position to slow down as it approaches the list position to give a "soft landing" effect to the movement of the list item into the list position.

In the embodiment shown in FIGS. 3-8, the scroll distance/manipulator movement distance correspondence changes during scrolling due to varying distances between list positions. In other embodiments, a list item may grow in size, may reveal additional content (such as an image or icon), or may undergo other such changes in appearance upon movement into the highlighted list position 308, as the larger spacing between the highlighted list position 308 and other list positions allows the accommodation of such changes. Other changes also may occur, such as changes in opacity, color, etc. as a list item moves into and out of the highlighted list position 308.

Some computing devices may support inertial scrolling to allow a user to quickly browse through long lists. Inertial scrolling is scrolling that continues after completion of the input gesture that causes the scrolling. For example, in the example of a touch-sensitive display, a user may inertially scroll a list by quickly flicking a finger on the display along a direction of scrolling. The acceleration and/or velocity of the input gesture may be used to determine a velocity and duration of list scrolling.

Some scrollable lists may be "wrapped" lists that allow a user, upon scrolling to an end of the list, to wrap back to the other end list to continue scrolling in the same direction. In the case of such a wrapped list, a user may desire for scrolling to stop at the boundary between the beginning and end of a wrapped list to indicate to a user that this boundary has been reached. FIG. 9 shows an embodiment of a method 900 of performing inertial scrolling of a wrapped list on a computing device having a touch-sensitive display. First, method 900 comprises, at 902, displaying a wrapped scrollable list of items on the display, and then, at 904, receiving a first input requesting an inertial scrolling of the list such that scrolling continues in an inertial manner after cessation of the inertial touch input. In response, method 900 comprises, at 906, performing an inertial scrolling of the list. Upon reaching a boundary between a beginning of a list and an end of the list during the inertial scrolling, method 900 comprises, at 908, stopping the inertial scrolling at the boundary. In some embodiments, a bouncing of the list upon reaching the boundary during inertial scrolling may be animated.

Next, if a user wishes to scroll past the boundary between the beginning and end of the list, the user may use a "dragging" touch, cursor, and/or non-touch gesture input, (depending on the input device used) as opposed to an inertial scrolling input, to pull the list across the boundary by maintaining touch contact with the touch-sensitive display while crossing the boundary. Therefore, method 900 comprises, at 910, receiving a second input requesting scrolling of the list past the boundary, and then, at 912, scrolling the list past the boundary if the list reaches the boundary during performance of the second input. In this manner, a user may scroll past the boundary via a deliberate, intended dragging input.

It will be appreciated that the computing devices described herein may be any suitable computing device configured to execute the programs described herein. For example, the computing devices may be a mainframe computer, personal computer, laptop computer, personal digital assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method of operating a computing device display, the method comprising:
    displaying a scrollable list of items on the computing device display, the scrollable list of items comprising a first pair of list positions separated by a first spacing on the display, and a second pair of list positions separated by a second spacing, such that the first spacing on the display is different from the second spacing on the computing device display;
    detecting an input that comprises a movement of a manipulator from a first location to a second location to cause scrolling of the scrollable list;
    in response to the input, scrolling a first list item on the computing device display between the first pair of list positions at a first scroll distance/manipulator movement distance correspondence, and scrolling a second list item between the second pair of list positions at a second scroll distance/manipulator movement distance correspondence that is different from the first scroll distance/manipulator movement distance correspondence.

2. The method of claim 1, wherein the first scroll distance/manipulator movement distance correspondence is 1/1, and wherein the second scroll distance/manipulator movement distance correspondence is greater than 1/1.

3. The method of claim 1, wherein the second scroll distance/manipulator movement distance correspondence is equal to a ratio of the second spacing over the first spacing.

4. The method of claim 1, wherein the scrolling direction is vertical.

5. The method of claim 1, wherein the first pair of list positions are unhighlighted list positions, and wherein the second pair of list positions includes a highlighted list position in which additional information regarding a list item is displayed.

6. The method of claim 1, further comprising moving the second list item in a direction normal to scrolling direction and along a scrolling direction when scrolling between the second pair of list positions.

7. The method of claim 1, wherein a distance of the movement of the manipulator on the computing device display is equal to the first spacing.

8. The method of claim 1, wherein the scrollable list of items is a wrapped list of items, and wherein the method further comprises receiving an inertial input requesting an inertial scrolling of the scrollable list such that scrolling continues in an inertial manner after cessation of the inertial input;
- in response, performing the inertial scrolling of the scrollable list;
- upon reaching a boundary between a beginning of the scrollable list and an end of the scrollable list during the inertial scrolling, stopping the inertial scrolling at the boundary;
- receiving a dragging input requesting scrolling of the scrollable list past the boundary; and
- scrolling the scrollable list past the boundary if the scrollable list reaches the boundary during performance of the dragging input.

9. The method of claim 1, wherein detecting an input comprises detecting a touch input on a touch-sensitive display.

10. A computing device, comprising:
- a touch-sensitive display;
- a processor; and
- memory comprising instructions stored thereon that are executable by the processor to:
- display a scrollable list of items on the touch-sensitive display, the scrollable list of items comprising a plurality of unhighlighted list positions each separated by a first spacing on the touch-sensitive display and a highlighted list position separated from an adjacent unhighlighted list position by a second spacing that is larger than the first spacing;
- detect a touch input that comprises a movement of a touch on the touch-sensitive display a first location to a second location on the touch-sensitive display along a scrolling direction;
- in response to detecting the touch input, scroll a first list item between adjacent unhighlighted list positions at a 1/1 scroll distance/touch movement distance correspondence to the touch input along the scrolling direction of the scrollable list, and scrolling a second list item into the highlighted list position at a scroll distance/touch movement distance correspondence other than 1/1.

11. The computing device of claim 10, wherein the scroll distance/touch movement distance correspondence other than 1/1 is greater than 1/1.

12. The computing device of claim 10, wherein the scroll distance/touch movement distance correspondence other than 1/1 comprises a ratio of the second spacing/first spacing.

13. The computing device of claim 10, wherein the instructions are further executable to move a list item in a direction normal to the scrolling direction and in a direction along the scrolling direction when moving to the highlighted list position from the adjacent unhighlighted list position.

14. The computing device of claim 10, wherein the scrolling direction is a vertical direction on the touch-sensitive display.

15. The computing device of claim 10, wherein the scrollable list of items is a wrapped list of items, and wherein the instructions are further executable to receive an inertial touch input requesting an inertial scrolling of the scrollable list such that scrolling continues in an inertial manner after cessation of the inertial touch input;
- in response, display an inertial scrolling of the scrollable list;
- upon reaching a boundary between a beginning of the scrollable list and an end of the scrollable list during the inertial scrolling, stop the inertial scrolling at the boundary;
- receive a dragging touch input requesting scrolling of the scrollable list past the boundary; and
- scroll the scrollable list past the boundary if the scrollable list reaches the boundary during performance of the dragging touch input.

16. A computing device, comprising:
- a display;
- a processor; and
- memory comprising instructions stored thereon that are executable by the processor to:
- display a wrapped scrollable list of items on the display, the wrapped scrollable list comprising a first adjacent pair of list positions separated by a first spacing on the display, and a second pair of adjacent list positions separated by a second spacing that is different than the first spacing;
- receive a first touch input requesting an inertial scrolling of the list such that scrolling continues in an inertial manner after cessation of the first touch input;
- in response to receiving the first touch input, perform an inertial scrolling of the list;
- upon reaching a boundary between a beginning of the wrapped scrollable list and an end of the wrapped scrollable list during the inertial scrolling, stop the inertial scrolling at the boundary;
- receive a second touch input requesting scrolling of the wrapped scrollable list past the boundary; and
- scroll the wrapped scrollable list past the boundary if the wrapped scrollable list reaches the boundary while maintaining touch contact during performance of the second touch input.

17. The computing device of claim 16, wherein the instructions are further executable to animate a bouncing of the wrapped scrollable list upon reaching the boundary during inertial scrolling.

18. The computing device of claim 16, wherein the instructions are further executable to:
- in response to the first touch input and second touch input, scroll a first list item on the display between the first pair of list positions at a first scroll distance/manipulator movement distance correspondence, and scroll a second list item between the second pair of list positions at a second scroll distance/manipulator movement distance correspondence that is different from the first scroll distance/manipulator movement distance correspondence.

19. The computing device of claim 18, wherein the first scroll distance/manipulator movement distance correspondence is 1/1, and wherein the second scroll distance/manipulator movement distance correspondence is greater than 1/1.

20. The computing device of claim 18, wherein the second scroll distance/manipulator movement distance correspondence is equal to the ratio of the second spacing over the first spacing.

* * * * *